Dec. 12, 1944.   H. J. STEWART   2,365,019
INSULATED ELECTRICAL CONDUCTOR
Filed June 9, 1942
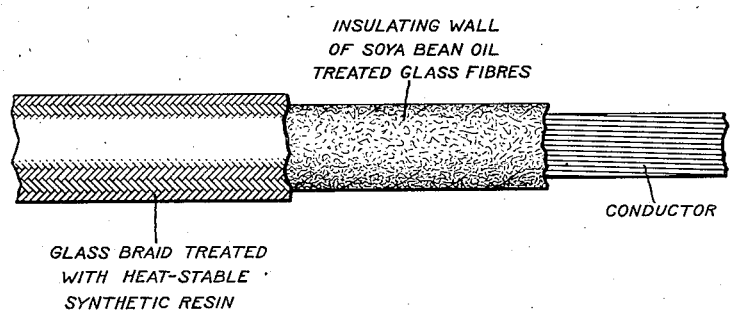
Inventor:
Howard J. Stewart,
by Harry E. Dunham
  His Attorney.

Patented Dec. 12, 1944

2,365,019

UNITED STATES PATENT OFFICE 2,365,019

INSULATED ELECTRICAL CONDUCTOR

Howard J. Stewart, York, Pa., assignor to General Electric Company, a corporation of New York Application June 9, 1942, Serial No. 446,325

3 Claims. (Cl. 174—120)

The present invention relates to insulated electrical conductors and is more particularly directed to the production of insulated electrical conductors adapted for use as lead wires for coils for low voltage electrical apparatus.

In the manufacture of motor field coils and coils for other electrical applications it is the universal practice to attach leads to the coils prior to varnish treatment of the structure. The varnish treatment usually consists in dipping the coils in a varnish and subjecting them to a baking period of 4 to 12 hours at about 150° C. The attached leads are immersed in the varnish during the treating operation at the point where they are united to the coil and to a depth of as much as 4 inches of their length. After the baking treatment, the leads, which ordinarily contain varnished cambric, or rubber insulation, and a cotton braid, become stiff resulting in cracking of the braid and insulation during installation in motor frames and other electrical apparatus.

The substitution of glass fibres for the cotton braid and varnished cambric or rubber insulation does not overcome the difficulty. Attempts to make leads utilizing a glass yarn wrap and a glass yarn braid, the lead then being treated with a varnish and baked, were not successful, even though it was thought that the high tensile strength of the glass structure would overcome the difficulties encountered. In the coil baking operation it was found that the varnish set to a point where flexibility was destroyed and cracking of the insulation and braid was again encountered. In addition, leads made in this manner were difficult to produce since the glass insulation did not remain in place during the braiding operation and it tended to strip back as the braid was applied.

The present invention overcomes the foregoing difficulties and produces glass insulated electrical conductors, particularly adapted for use as lead wires for motor coils. The insulated conductors of my invention retain their flexibility and the insulation is intact even after prolonged baking at elevated temperatures. Additionally, the insulated electrical conductors of my invention maintain their electrical insulating qualities even after prolonged immersion in water.

In accordance with my invention a wall of glass sliver or staple yarn, preferably yarns for uniformity of wall, is applied to the electrical conductor, for example, a stranded copper conductor, by means of a generally known and universally used wrapping head for applying multiple ends of fibrous yarns. The glass insulated wire is passed through a bath of soya bean oil and then through a polishing device to remove the excess oil and compress the yarn into a uniform compact mass to give a smooth surface over which a braid can be applied.

Prior to applying the glass braid the soya bean oil treated insulated conductor is heat-treated for a period of 12 hours at a temperature of approximately 100° C. The time and temperature of treatment may be varied depending upon the equipment available, the sole object being to set the oil and prevent stripping of the insulation during the braiding operation.

The glass braid is then applied over the soya bean oil treated insulated conductor, and the braided and insulated conductor treated with a synthetic resin varnish of good heat stability such as an oil modified phenolic resin varnish or a synthetic resin varnish of the alkyd resin type. The varnish is applied in multiple dips, each dip of varnish being baked immediately after application by passing the wire thru a suitable oven. The gravity of the varnish, the time and temperature of baking will vary with the type of varnish and oven equipment available.

An insulated electrical conductor is thus obtained having excellent flexibility which is maintained during subsequent coil baking operations. It is to be noted that soya bean oil is used to impregnate and coat the glass yarn insulation. The results obtained, in accordance with my invention, are due to the use of this specific oil which is superior to other vegetable oils such as boiled linseed oil, castor oil and China-wood oil, in that it cures uniformly on the insulated conductor without producing uncured pockets of oil as is the case with the other oils. Such pockets of uncured oil oxidize and bloom through the varnish on the braid giving a mottled appearance and producing a non-uniform surface coating. Moreover, the final product is markedly superior in flexibility. In addition, insulated conductors produced in accordance with my invention produce an additional unexpected result in that such insulated conductors show good electrical properties even after immersion in water for a period of one hour, a property not usually obtained with the ordinary varnish treated insulated conductors. For example, an insulated conductor, made in accordance with my invention, showed on test an average initial breakdown value of 2304 volts after being subjected to a stress of 1000 volts for one minute and after immersion in water for one hour, an average breakdown value of 1368 volts.

Where special type of soldering or welding is necessary in attaching leads of the character herein set forth and oxidation of the copper may interfere, a paper, Cellophane, cellulose acetate, etc., separator is placed between the copper conductor and the glass insulation to act as a barrier to the penetration of the oil into and around the strands of the conductor.

The figure in the drawing is a view in elevation illustrating the invention.

What I claim as new and desire to secure by Letters Patent of the United States is:

1. An insulated electrical conductor comprising a metallic conductor, an insulating wall of glass fibres surrounding said conductor, said glass fibres being coated and impregnated with a heat-set soya bean oil, a glass braid over said insulation wall and a baked, heat-stable synthetic resin coating and impregnant on said braid.

2. A flexible motor lead comprising a stranded copper conductor, an insulating wall of heat-set soya bean oil treated glass fibres surrounding said conductor and a heat-stable phenolic resin-treated glass braid on said insulation.

3. The process of making an insulated electrical conductor which comprises applying glass fibrous yarns to a metallic conductor to build up an insulating wall over said conductor, passing the insulated conductor through a bath of soya bean oil, removing the excess oil and compressing the insulating wall to uniform size, heat-treating the insulated conductor at an elevated temperature for a period of time sufficient to set the oil, applying a glass braid to the insulated conductor, treating the braided and insulated conductor with a heat-stable synthetic resin varnish and baking the treated product.

HOWARD J. STEWART.